United States Patent [19]
Futami et al.

[11] Patent Number: 5,581,140
[45] Date of Patent: Dec. 3, 1996

[54] PERMANENT MAGNETIC ROTOR AND PRODUCING APPARATUS OF THE SAME

[75] Inventors: Toshihiko Futami, Kanagawa-ken; Yoshiharu Shida, Shizuoka-ken, both of Japan

[73] Assignee: Kabushiki Kaisha Toshiba, Kawasaki, Japan

[21] Appl. No.: 114,842

[22] Filed: Sep. 2, 1993

[30] Foreign Application Priority Data

Sep. 2, 1992 [JP] Japan .................................. 4-234867
Feb. 17, 1993 [JP] Japan .................................. 5-028269

[51] Int. Cl.$^6$ ............................................ H02K 21/12
[52] U.S. Cl. ............................................ 310/156
[58] Field of Search ........................ 310/156, 181, 310/51, 261, 42, 208; 118/181, 51, 261, 42; 29/598

[56] References Cited

U.S. PATENT DOCUMENTS

| | | | |
|---|---|---|---|
| 1,843,222 | 2/1932 | Harley | 310/156 |
| 4,474,259 | 5/1988 | Schaefer | 310/156 |
| 4,973,872 | 11/1990 | Dohogne | 310/156 |
| 5,258,678 | 11/1993 | Futami | 310/156 |

*Primary Examiner*—Thomas M. Dougherty
*Assistant Examiner*—Michael Wallace, Jr.
*Attorney, Agent, or Firm*—Oblon, Spivak, McClelland, Maier & Neustadt, P.C.

[57] ABSTRACT

A permanent magnetic rotor is disclosed, which comprises a rotor iron core constructed of a large number of steel plates being layered, each of the steel plates peripherally defining a plurality of sector-shaped blanked holes, and sector-shaped permanent magnetic pieces inserted into the blanked holes, wherein each of the steel plates comprises an outer peripheral ring portion formed on an outer side of the blanked hole, a yoke portion formed on an inner side of the blanked hole, a connect portion formed between the outer peripheral ring portion and the yoke portion, and thin and long fitting protrusions formed at corner portions of the blanked hole in the vicinity of the connect portion, the fitting protrusions protruding to the magnet insertion hole, the fitting protrusions being fitted to the permanent magnetic piece so as to pressure and fix the permanent magnetic piece.

14 Claims, 16 Drawing Sheets

PERMANENT MAGNETIC ROTOR AND PRODUCING APPARATUS OF THE SAME

BACKGROUND OF THE INVENTION

1. Field of the Invention

The present invention relates to a permanent magnetic rotor and a producing apparatus of the same, in particular, to a permanent magnetic rotor with fitting protrusions for pressuring and fixing permanent magnetic pieces in magnet insertion holes and a producing apparatus of the same.

2. Description of the Related Art

A permanent magnetic rotor which has a rotor iron core with blanked holes into which sector-shaped permanent magnet pieces are inserted is known. In this permanent magnetic rotor, the rotor iron core is made by layering a plurality of circular steel plates with blanked holes defined between two concentric circles at intervals of predetermined angles.

FIG. 29 is an exploded perspective view showing a conventional permanent magnetic rotor. In the figure, reference numeral 51 is a permanent magnetic rotor. The permanent magnetic rotor 51 comprises a rotor iron core 54, a plurality of permanent magnetic pieces 56, a pair of end plates 57, and a plurality of rivets 58. The rotor iron core 54 is made of a large number of steel plates 53 being layered. Each of the steel plates 53 has sector-shaped blanked holes 52. The blanked holes 52 of the steel plates 53 define magnet insertion holes 55. The permanent magnetic pieces 56 are inserted into the respective magnet insertion holes 55. The end plates 57 are disposed at both the ends of the rotor iron core 54. The end plates 57 are connected to the rotor iron core 54 by the rivets 58.

FIG. 30 is a cross sectional view showing the permanent magnetic rotor 51. In the figure, the steel plate 53 has a circular outer periphery. On the steel plate 53, the blanked holes 52 are defined between two concentric circles at intervals of approximately 90 degrees. The blanked holes 52 of the steel plates 53 being layered define the magnet insertion holes 55. An outer portion of the magnet insertion holes 55 of the rotor iron core 54 is an outer peripheral ring portion 59. An inner portion of the magnet insertion holes 55 of the rotor iron core 54 is a yoke portion 60. The outer peripheral ring portion 59 and the yoke portion 60 are connected by connect portions 61. In the magnet insertion holes 55, the respective permanent magnetic pieces 56 are inserted. The sectional shape of each permanent magnetic piece 56 nearly accords with the opening shape of each magnet insertion hole 55.

While the rotor is being rotated, each permanent magnetic piece 56 is exposed to centrifugal force and vibrations. To prevent the permanent magnetic piece 56 from vibrating, it must be fixed in the corresponding magnet insertion hole 55. However, the width of the outer peripheral ring portion 59 is preferably as narrow as possible so as to prevent magnetic flux from leaking. Thus, it is difficult to pressure and fix each permanent magnetic piece 56 in the corresponding magnet insertion hole 55 with large compression force due to the limitation of mechanical strength of the outer peripheral ring portion 59. In addition, it is also difficult to produce the permanent magnetic pieces 56 with high dimensional accuracy. Thus, the sectional shape of each permanent magnetic piece 56 does not accord with the opening shape of the corresponding magnet insertion hole 55 with high accuracy.

To solve this problem, in the conventional permanent magnetic rotor 51, a resin is injected between each permanent magnetic piece 56 and the corresponding magnet insertion hole 55 so as to fix the permanent magnetic piece 56. Alternatively, each permanent magnetic piece 56 is fixed by such a means as die-casting. As a result, the number of production steps of the permanent magnet rotor increases, thereby raising the production cost thereof.

To solve such a problem, however, a permanent magnetic rotor with protrusions has been proposed (as Japanese Patent Laid-Open Publication Serial No. SHO 63-80744). In the permanent magnetic rotor, protrusions are formed on the inner side of each magnet insertion hole. Each protrusion outwardly pressures a permanent magnetic piece so as to fix it.

FIG. 31 is an enlarged sectional view showing the permanent magnetic rotor disclosed in the Japanese Patent Laid-Open Publication Serial No. SHO 63-80744. In the figure, reference numeral 71 is a permanent magnetic rotor. The permanent magnetic rotor 71 comprises a rotor iron core 72 and permanent magnetic pieces 73. The rotor iron core 72 comprises a nearly cylinder-shaped yoke portion 74 and a narrow ring-shaped outer peripheral ring portion 75. Each permanent magnetic piece 73 is sector-shaped and disposed between the yoke portion 74 and the outer peripheral ring portion 75.

On the outer periphery of the yoke portion 74 of the permanent magnetic piece 73, a plurality of protrusions 76 which fix a permanent magnetic piece are formed. At a base portion of each protrusion 76, an opening 77 which creates an elastic force in the radial direction of the protrusion 76 is defined.

In the permanent magnetic rotor 71, the forward end of each protrusion 76 comes in contact with the inner side of the permanent magnetic piece 73. In addition, the forward end of the protrusion 76 is deformed by the compression force and the action of the opening 77. As the reaction, the permanent magnetic piece 73 is pressured toward the outer peripheral ring portion 75 by an elastic restoring force of the protrusion 76. Thus, the permanent magnetic piece 73 is fixed.

In the conventional permanent magnetic rotor with the protrusions, the opening defined at the base portion of each protrusion applies an elastic force to the protrusion. However, in this method, since the elastic coefficient in the radial direction of the protrusion is large, a large reaction tends to take place corresponding to a small compression displacement. Thus, the compression force of the protrusion is likely to break the permanent magnetic piece.

In addition, since the opening defined at the base portion of the protrusion is present at the yoke portion of the rotor iron core which is a passway of the magnetic flux of the permanent magnetic piece, it prevents the magnetic flux from flowing. Thus, the magnetic characteristics of the permanent magnetic piece are deteriorated.

SUMMARY OF THE INVENTION

An object of the present invention is to solve the problems of the conventional permanent magnetic rotor and to provide a permanent magnetic rotor which securely fixes permanent magnetic pieces in respective magnet insertion holes without deteriorating the magnetic characteristics of the permanent magnetic pieces.

Since this permanent magnetic rotor has long and narrow fitting protrusions, the opening shape of each blanked hole is more complicated than that of the conventional permanent magnetic rotor. Thus, by the conventional permanent magnetic rotor producing apparatus, the permanent magnetic rotor according to the present invention cannot be easily produced.

Another object of the present invention is to provide a permanent magnetic rotor producing apparatus which can easily and securely produce the permanent magnetic rotor according to the present invention.

A first aspect of the present invention is a permanent magnetic rotor comprising a rotor iron core constructed of a large number of steel plates being layered, each of the steel plates peripherally defining a plurality of sector-shaped blanked holes, and sector-shaped permanent magnetic pieces inserted into the blanked holes, wherein each of the steel plates comprises an outer peripheral ring portion formed on an outer side of the blanked hole, a yoke portion formed on an inner side of the blanked hole, a connect portion formed between the outer peripheral ring portion and the yoke portion, and thin and long fitting protrusions formed at corner portions of the blanked hole in the vicinity of the connect portion, the fitting protrusions protruding to the magnet insertion hole, the fitting protrusions being fitted to the permanent magnetic piece so as to pressure and fix the permanent magnetic piece.

A second aspect of the present invention is a permanent magnetic rotor producing apparatus for inserting permanent magnetic pieces into respective magnet insertion holes of a rotor iron core made of a large number of steel plates which have blanked holes, the apparatus comprising a first pressure apply device for pressuring the rotor iron core, and second pressure apply device for pressure-inserting the permanent magnetic pieces into the magnet insertion holes while the rotor iron core is being pressured by the first pressure apply means.

The permanent magnetic rotor according to the present invention has narrow tang-shaped fitting protrusions on the inner side of each magnet insertion hole. With the fitting protrusions, each permanent magnetic piece is outwardly tensioned and fixed. Since the fitting protrusions are thin and long, they securely fix the permanent magnetic piece with an elastic restoring force corresponding to a relatively large displacement. In addition, since the elastic restoring force of the fitting protrusions corresponding to the deformation is in a relatively small range, the compression force is unlikely to damage each permanent magnetic piece.

In addition, the fitting protrusions according to the present invention are formed at corner portions of each magnet insertion hole, it is not necessary to define a hole at the yoke portion of the rotor iron core in which the magnetic flux flows. Thus, the fitting protrusions do not prevent the magnetic flux of the permanent magnetic piece from flowing. Thus, the magnetic characteristics of each permanent magnetic piece are not degraded.

In the permanent magnetic rotor producing apparatus according to the present invention, before permanent magnetic pieces are pressure-inserted by the first pressure apply device, the rotor iron core is pressured in the axial direction of the rotor. In this condition, the permanent magnetic pieces are pressure-inserted by the second pressure apply devices. Thus, while the permanent magnetic pieces are being pressure-inserted, the rotor iron core is being pressured in the axial direction of the rotor. Thus, the outer peripheral ring portion of the rotor iron core can be prevented from being deformed in the direction that the permanent magnetic pieces are pressured.

Moreover, in the permanent magnetic rotor producing apparatus, when necessary, the guide which guides permanent magnetic pieces which are pressure-inserted by the first pressure apply device is provided. Thus, with the guide, the permanent magnetic pieces can be more easily pressure-inserted.

The first pressure apply device can be provided with the outer periphery holding ring which restricts a deformation such as expansion in the radial direction of the rotor iron core. The outer periphery holding ring portion can prevent the rotor iron core from being deformed in the radial direction thereof when permanent magnetic pieces are pressure-inserted.

Furthermore, protrusions can be provided at least on the first pressure apply device and the table which holds the rotor iron core. The protrusions pressure the outer peripheral ring portion. With the protrusions, the deformation in the axial direction of the outer peripheral ring portion can be limited to a predetermined range. By using the end plate which is in contact with the end surface of the rotor iron core being deformed, the magnetic efficiency of the permanent magnetic rotor can be improved.

These and other objects, features and advantages of the present invention will become more apparent in light of the following detailed description of best mode embodiments thereof, as illustrated in the accompanying drawings.

DESCRIPTION OF PREFERRED EMBODIMENTS

In a permanent magnetic rotor according to the present invention, a large number of steel plates with blanked holes are layered so as to form a rotor iron core. The blanked holes of the steel plates being layered define magnet insertion holes. In the magnet insertion holes, permanent magnetic pieces are inserted. Fitting protrusions are formed partially around each blanked hole. The fitting protrusions are fitted to a permanent magnetic piece inserted into a magnet insertion hole. By the elastic restoring force of the fitting protrusions, the permanent magnetic piece is outwardly pressured so as to fix the permanent magnetic piece. Next, embodiments of the present invention will be described with reference to the accompanying drawings.

First Embodiment

Figure 1:
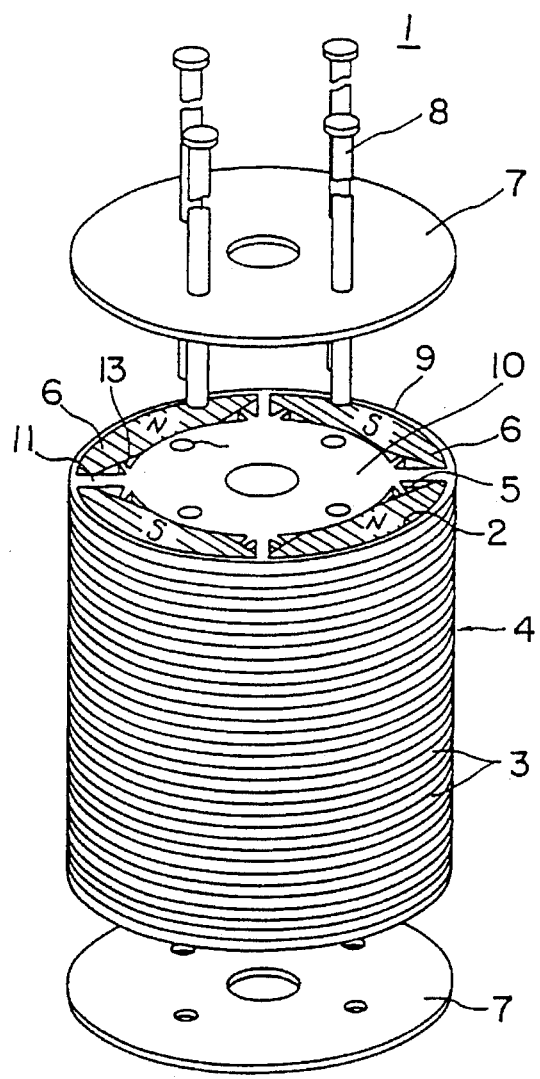
FIG. 1 is an exploded perspective view showing a permanent magnetic rotor according to a first embodiment of the present invention.

FIG. 1 is an exploded perspective view showing a permanent magnetic rotor according to a first embodiment of the present invention. In the figure, reference numeral 1 is a permanent magnetic rotor. The permanent magnetic rotor 1 comprises a rotor iron core 4, permanent magnetic pieces 6, a pair of end plats 7, and rivets 8. The rotor iron core 4 is made by layering a large number of circular steel plates 3 with blanked holes 2. The blanked holes 2 of the steel plates 3 being layered define magnet insertion holes 5. The permanent magnetic pieces 6 are inserted into the respective magnet insertion holes 5. The end plates 7 are disposed on both the ends of the rotor iron core 4. The end plates 7 are connected to the rotor iron core 4 by the rivets 8.

Figure 2:
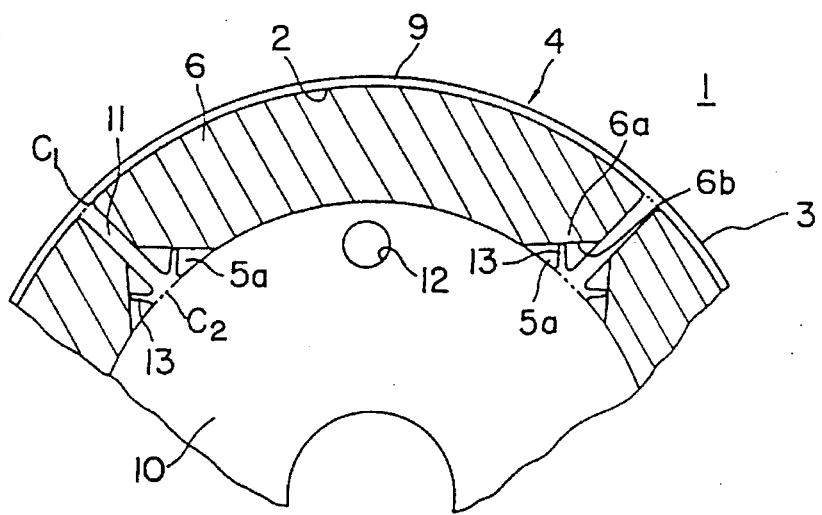
FIG. 2 is a partial enlarged cross-sectional view showing the permanent magnetic rotor according to the first embodiment of the present invention.

FIG. 2 is a partial enlarged cross sectional view showing the permanent magnetic rotor 1. As shown in the figure, the blanked holes 2 are defined among the circular steel plate 3 and two concentric circles C1 and C2 at intervals of approximately 90 degrees. An outer portion of the blanked holes 2 of the rotor iron core 4 is an outer peripheral ring portion 9. An inner portion of the blanked holes 2 is a yoke portion 10. The outer peripheral ring portion 9 and the yoke portion 10 are connected by connect portions 11. At a peripheral portion of the yoke portion 10, rivet through-holes 12 which pass the rivets 8 are defined.

At each corner portion 5a on the inner side of each magnet insertion hole 5 defined by the blanked holes 2, a narrow and long tang-shaped fitting protrusion 13 is formed. The fitting protrusion 13 protrudes toward an opening center portion of the magnet insertion hole 5. The permanent magnetic piece 6 has a sector shape which nearly accords with the opening portion of the corresponding magnet insertion hole 5. The dihedral angle of each inner corner 6a of the permanent magnetic piece 6 is chamfered and thereby a chamfer surface 6b is formed. The froward end of the fitting protrusion 13 is elastically in contact with the chamfer surface 6b of the permanent magnetic piece 6.

Figure 3:
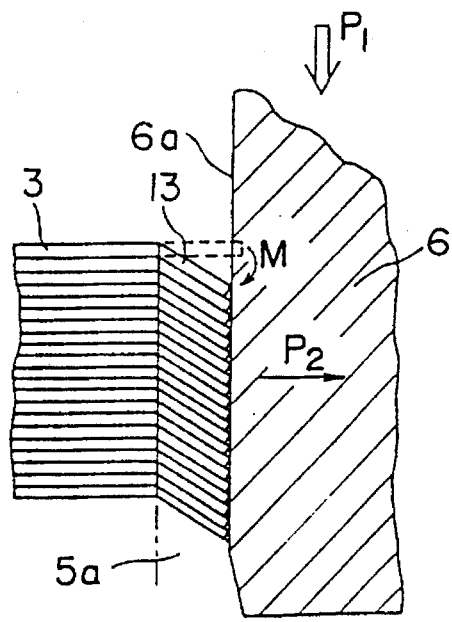
FIG. 3 is an enlarged longitudinal sectional view showing a fitting condition between fitting protrusions and a permanent magnetic piece according to the first embodiment of the present invention.

FIG. 3 is an enlarged longitudinal sectional view showing a fitting condition between fitting protrusions 13 and a permanent magnetic piece 6 in a magnet insertion hole 5. When the permanent magnetic piece 6 is pressure-inserted into the magnet insertion hole 5, the permanent magnetic piece 6 is pressured in a direction P1 to the magnet insertion hole 5 of the rotor iron core 4. The forward end of the fitting protrusion 13 formed at the corner portion 5a of the magnet insertion hole 5 is fitted to the chamfer surface 6b of the permanent magnetic piece 6. By the pressure of the permanent magnetic piece 6, the forward end of the fitting protrusion 13 is bent in a direction M. After the permanent magnetic piece 6 is inserted into the magnet insertion hole 5, the permanent magnetic piece 6 is tensioned in a direction P2 by an elastic restoring force of the fitting protrusion 13.

In the above-described construction of the permanent magnetic rotor 1 according to the first embodiment, the permanent magnetic piece 6 is pressured to the outer peripheral ring portion 9 in the magnet insertion hole 5 outwardly in the radial direction by the fitting protrusions 13. Thus, the permanent magnetic piece 6 is fixed. Each fitting protrusion 13 protrudes from the corner portion 5a of the magnet insertion hole 5 to the chamfer surface 6b of the permanent magnetic piece 6. Since the fitting protrusion 13 has a proper elastic restoring force, it can securely fix the permanent magnetic piece 6. Thus, since an excessive pressure force is not applied to the permanent magnetic piece 6, it is not damaged. In addition, the permanent magnetic piece 6 is fixed by the inner corner 6a. Thus, since the rotor iron core 4 in which magnetic flux flows does not have an opening and there is no large gap between the rotor iron core 4 and the permanent magnetic piece 6, the magnetic characteristics of the permanent magnetic piece 6 is not degraded.

In the first embodiment, the fitting protrusion 13 was formed at the corner portion 5a on the inner side of the magnet insertion hole 5 and thereby the permanent magnetic piece 6 is tensioned to the outer peripheral ring portion 9. However, it should be noted that the fitting protrusion 13 may be formed at a corner portion on the outer side of the magnet insertion hole 5 so that the permanent magnetic piece 6 is tensioned to the yoke portion 10.

The elastic restoring force of the fitting protrusions 13 can be adjusted by disposing them in the direction that the steel plates 3 are layered at predetermined intervals.

Second Embodiment

Figure 4:
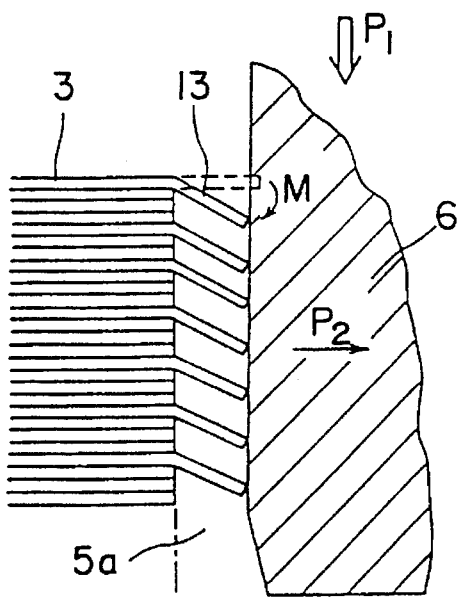
FIG. 4 is a longitudinal sectional view showing a fitting condition between fitting protrusions and a permanent magnetic piece, the fitting protrusions being disposed in the direction that steel plates are layered, according to a second embodiment of the present invention.

FIG. 4 is a longitudinal sectional view showing a fitting condition between fitting protrusions and a permanent magnetic piece, the fitting protrusions being disposed in the layer direction at predetermined intervals, according to a second embodiment of the present invention. In the figure, for the sake of simplicity, the similar portions are denoted by the similar reference numerals and the description thereof is omitted. Since the fitting protrusions 13 are disposed in the direction that the steel plates 3 are layered, the number of fitting protrusions 13 which come in contact with the permanent magnetic piece 6 is decreased per length unit thereof. Thus, the pressure force applied to the permanent magnetic piece 6 can be adjusted.

Third Embodiment

Figure 5:
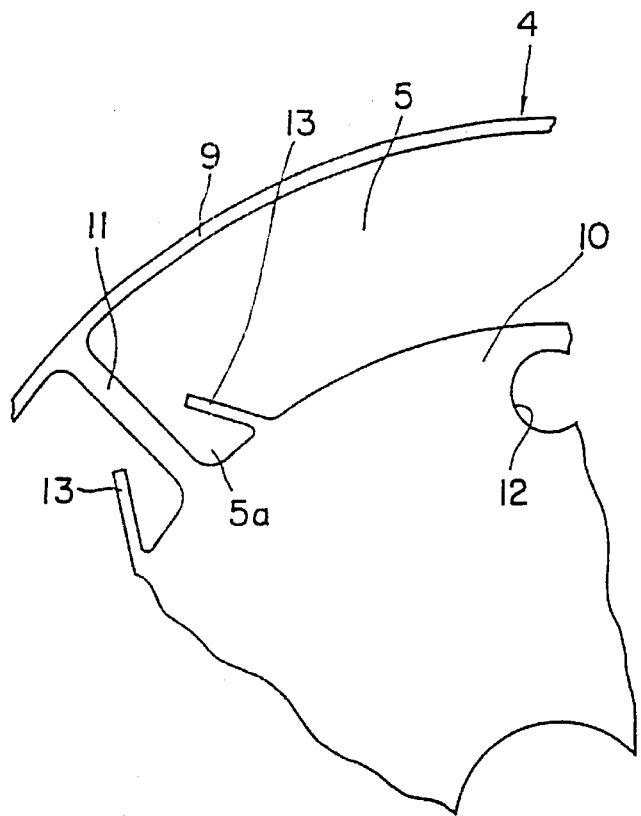
FIG. 5 is a partial enlarged plan view showing a rotor iron core according to a third embodiment of the present invention.
Figure 6:
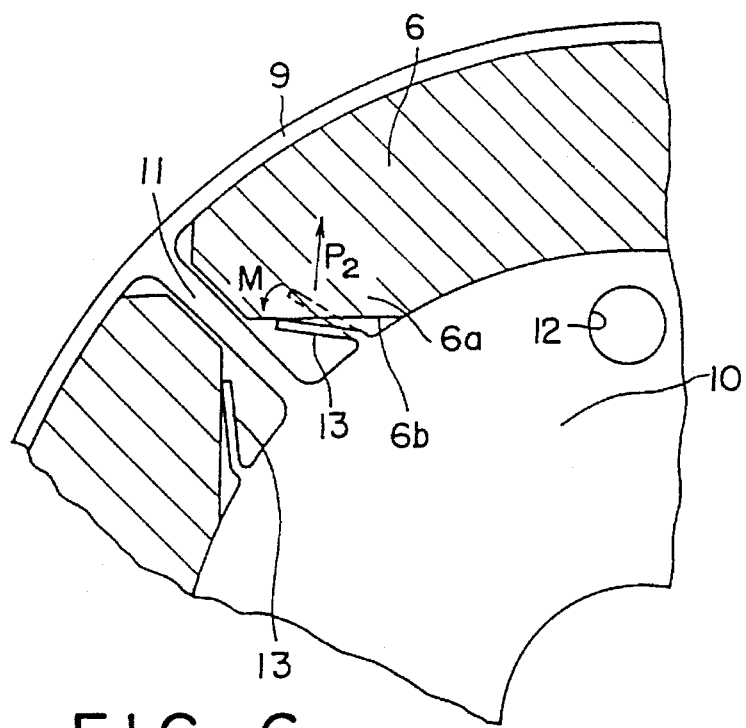
FIG. 6 is a sectional view showing a fitting condition between the rotor iron core and the permanent magnetic piece of FIG. 5 according to the third embodiment of the present invention.

FIG. 5 is an enlarged plan view showing a rotor iron core with fitting protrusions according to a third embodiment of the present invention. In this embodiment, each fitting protrusion 13 protrudes from the yoke portion 10 of the rotor iron core 4 to the connect portion 11 with a predetermined angle against the outer periphery of the yoke portion 10. The fitting protrusion 13 traverses the corner portion 5a of the magnet insertion hole 5. FIG. 6 is a sectional view showing the permanent magnetic piece 6 which is inserted into the magnet insertion hole 5 having the fitting protrusions 13. The inner corners 6a of the permanent magnetic piece 6 inserted into the magnet insertion hole 5 of the rotor iron core 4 are chamfered and thereby chamfer surfaces 6b are formed. As shown in FIG. 6, each chamfer surface 6b is angled so that it intersects with the fitting protrusion 13. Thus, when the permanent magnetic piece 6 is inserted into the magnet insertion hole 5, the chamfer surface 6b of the permanent magnetic piece 6 comes in contact with the forward end of the fitting protrusion 13. As a result, the fitting protrusion 13 is bent in a direction M shown in FIG. 6. By the elastic restoring force of the fitting protrusion 13, the permanent magnetic piece 6 is pressured in a direction P2 of the outer peripheral ring portion 9. Thus, the permanent magnetic piece 6 is fixed.

The fitting protrusion 13 according to the third embodiment is thin and long and protrudes from the yoke portion 10 toward the connect portion 11 in the direction that it traverse the corner portion 5a of the magnet insertion hole 5. Thus, when the steel plates are blanked, a technique is required. Next, the blanking steps of the steel plates according to the third embodiment will be described.

Figure 7:
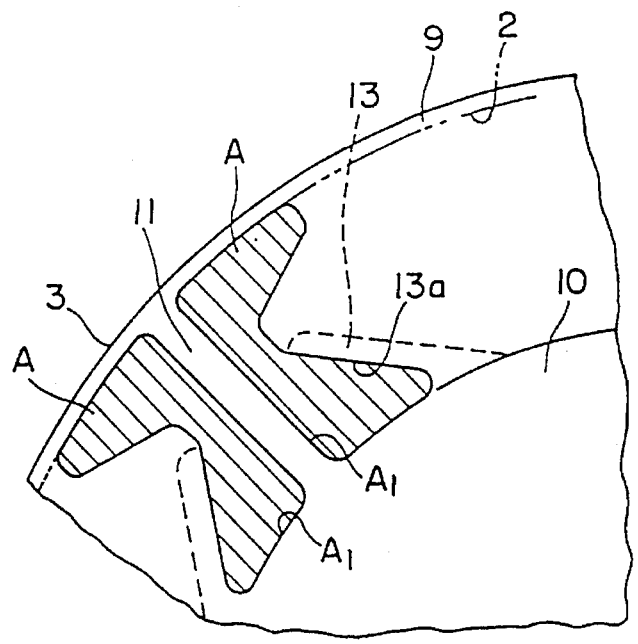
FIG. 7 is a plan view for explaining a first step for blanking a part of a hole including one side of a fitting protrusion.
Figure 8:
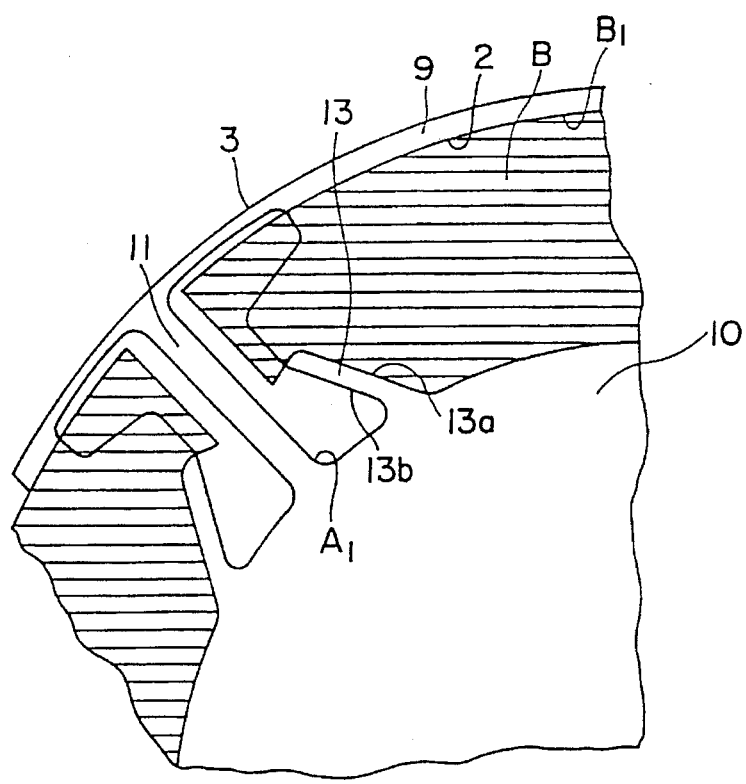
FIG. 8 is a plan view for explaining a second step for blanking the remaining of the hole including other sides of the fitting protrusion.

FIGS. 7 and 8 are plan views for explaining a first step and a second step for blanking the hole 2 according to the third embodiment, respectively. FIG. 7 shows the first blanking step for blanking one side 13a of the fitting protrusion 13 and an edge portion of the blanked hole 2. A hatched area A of the figure represents an opening portion A1 which is blanked by the first blanking step. A part of the periphery of the opening portion A1 accords with the side 13a of the corner portion of the fitting protrusion 13. After the first blanking step is completed, the second blanking step is performed as shown in FIG. 8. In the second blanking step, another side 13b of the fitting protrusion 13 and the remaining portion of the hole 2 are blanked. A hatched area B of FIG. 8 represents an opening portion B1 which is blanked by the second blanking step. A part of the periphery of the opening portion b1 accords with the side 13b of the fitting protrusion 13. By blanking the hole 2 of the steel plate 3 in the combination of the two opening portions A1 and B1, the fitting protrusion 13 can be formed free of bending in the direction that it traverses the corner of the blanked hole 2.

Figure 9:
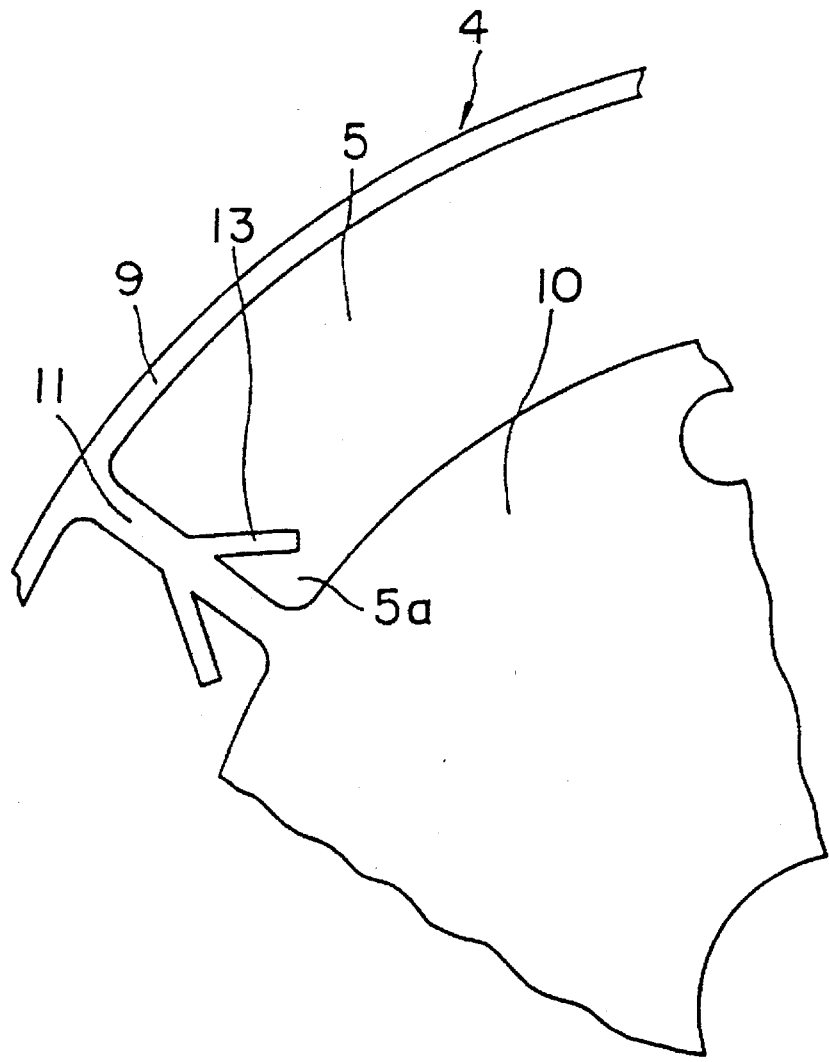
FIG. 9 is a partial enlarged plan view showing the rotor iron core according to the third embodiment of the present invention.

In the third embodiment, the fitting protrusion 13 protrudes from the yoke portion 10 toward the connect portion 11. However, as shown in FIG. 9, it should be noted that the fitting protrusion 13 may traverse the corner portion 5a of the magnet insertion hole 5 from the connect portion 11 toward the yoke portion 10.

Fourth Embodiment

Figure 10:
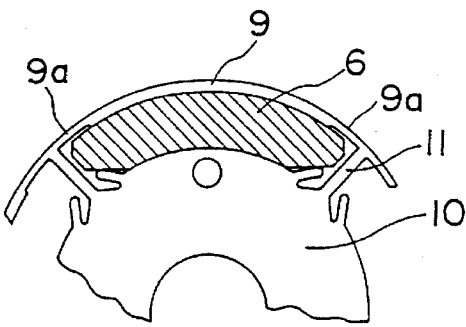
FIG. 10 is a partial sectional view showing a permanent magnetic rotor with an outer peripheral ring portion which is narrowed by two blanked areas.

When the blanked hole 2 is formed by the two successive blanking steps, Radial dimension of the area A is microscopically slightly larger than the area B. Thus, as shown in FIG. 10, the width of a portion 9a of the outer peripheral ring portion 9 which is in the vicinity of the connect portion 11 is narrowed. This narrow portion 9a of the outer peripheral ring portion causes the mechanical strength of the outer peripheral ring portion 9 to lower. The width of the narrow portion 9a of the outer peripheral ring portion should be determined so that the permanent magnetic piece 6 can be held at high speed rotation. Thus, the width of the outer peripheral ring portion 9 except for the portion 9a becomes wide. As a result, the magnetic efficiency is adversely lowered.

Figure 11:
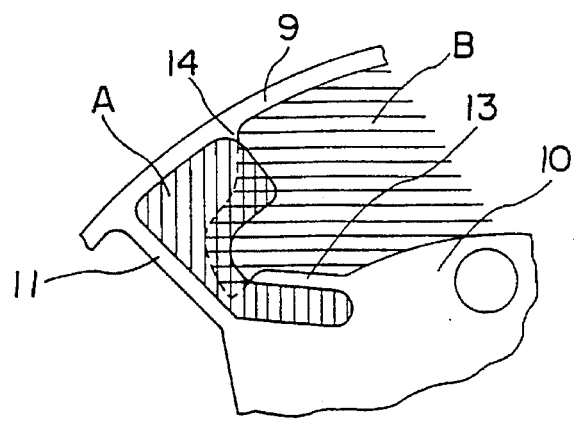
FIG. 11 is a sectional view showing the shape of a blanked hole with two blanked areas so that the width of the outer peripheral ring portion of a first blanked area becomes equal to that of a second blanked area.
Figure 12:
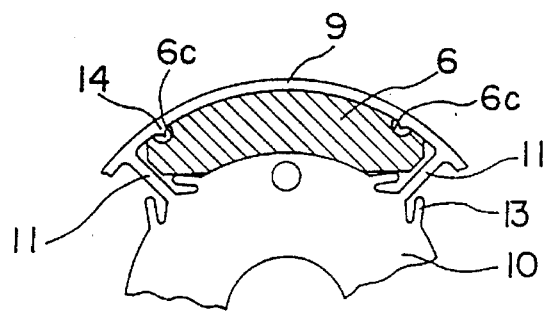
FIG. 12 is a partial sectional view showing a permanent magnetic rotor with a protrusion formed by an overlap of two blanked areas so that the width of the outer peripheral ring portion of the first blanked area becomes equal to that of the second blanked area, resulting in interfering portion with a permanent magnetic piece.

To solve this problem, as shown in FIG. 11, the areas A and B may be defined so that the width of the outer peripheral ring portion 9 at the area A becomes equal to that at the area B. In this case, as shown in the figure, a protrusion 14 results. To prevent such a protrusion 14, as shown in FIG. 12, a groove 6c may be formed on the outer periphery of the permanent magnetic piece 6. However, the groove 6c may prevent the magnetic flux from flowing, thereby deteriorating the magnetic characteristics.

To solve such a problem, in a permanent magnetic rotor according to a fourth embodiment of the present invention, a space is defined between a permanent magnetic piece and a magnet insertion hole so that the space does not prevent the magnetic flux form flowing. In addition, in the space, a protrusion is formed.

Figure 13:
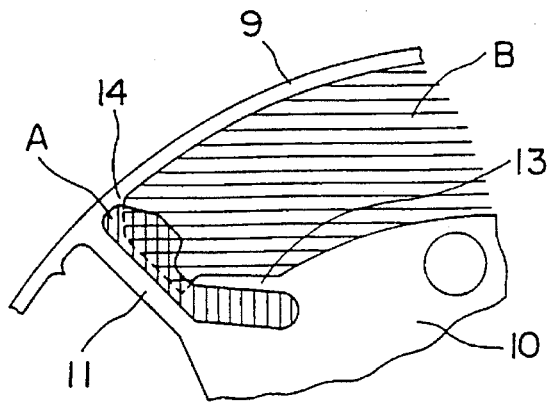
FIG. 13 is a sectional view for explaining the shapes of two blanked areas with a protrusion disposed in the vicinity of a connect portion and an overlap condition thereof.
Figure 14:
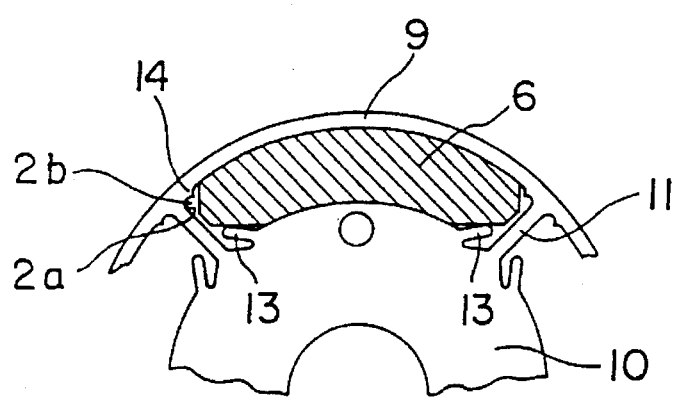
FIG. 14 is a partial sectional view showing a permanent magnetic rotor with a protrusion formed by two blanked areas at a corner portion in the vicinity of a connect portion.

FIGS. 13 and 14 show the fourth embodiment where the protrusion is formed at each corner portion on the outer side in the rotor axial direction of a blanked hole. In FIG. 13, an opening edge of an area A intersects with an opening edge of an area B in the vicinity of the connect portion 11.

The corner portion on the outer side in the rotor radial direction of the permanent magnetic piece 6 is chamfered as shown in FIG. 14. Thus, between the corner portion of the permanent magnetic piece 6 and the corner portion 2a of the blanked hole, a space 2b is defined. The protrusion 14 is inserted into the space 2b.

According to the fourth embodiment, the protrusion 14 does not prevent the permanent magnetic piece 6 from being inserted into the magnet insertion hole 5. In addition, the protrusion 14 does not prevent the magnetic flux of the permanent magnetic piece 6 from flowing. Moreover, the width on the entire outer peripheral ring portion 9 becomes equal. As a result, both the mechanical strength of the outer peripheral ring portion 9 and the magnetic efficiency can be satisfied.

Figure 15:
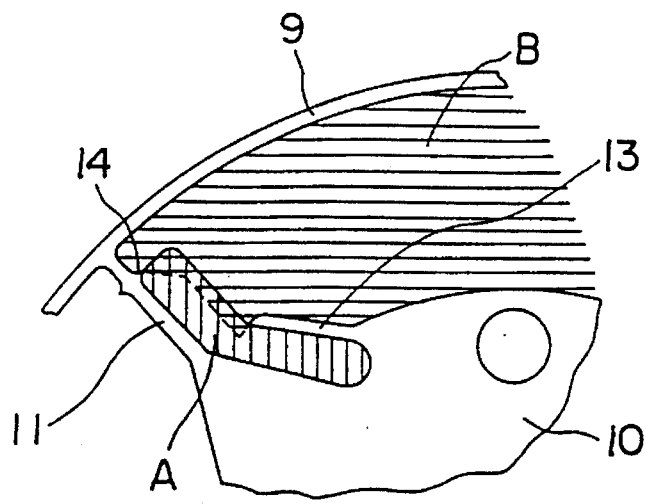
FIG. 15 is a perspective view for explaining the shapes of two blanked areas and an overlap condition thereof, a protrusion being formed at a connect portion.
Figure 16:
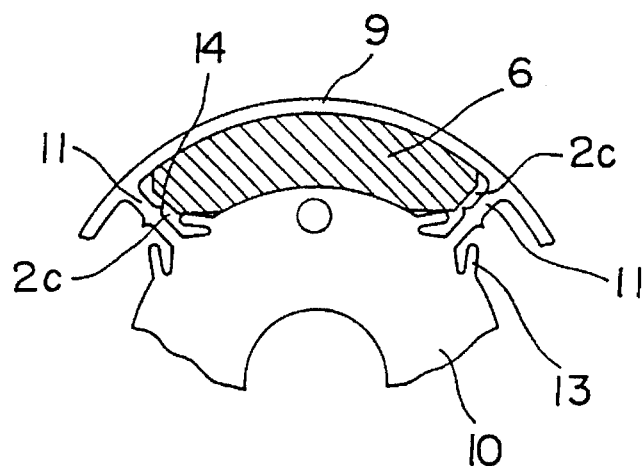
FIG. 16 is a partial sectional view showing a permanent magnetic rotor with a protrusion formed at a connect portion.

FIGS. 15 and 16 show a modification of the fourth embodiment. In this modification, as shown in FIG. 15, a protrusion 14 protrudes on both sides of a connect portion 11 so as to define areas A and B.

As shown in FIG. 16, the length in the rotor peripheral direction of the permanent magnetic piece 6 is short. In addition, as shown in the figure, between the edge portion of the permanent magnetic piece 6 and the connect portion 11, a space 2c is defined. The protrusion 14 is inserted into the space 2c.

Since the operation and effect of this modification are the same as those of the fourth embodiment, their description is omitted.

Fifth Embodiment

According to the permanent magnetic rotor of the present invention, each permanent magnetic piece is pressured outwardly in the rotator radial direction by fitting protrusions. However, to improve the magnetic efficiency of the permanent magnetic piece, the width of the outer peripheral ring portion is formed as narrow as possible. However, it is technically impossible to improve the machining accuracy of the permanent magnetic piece. Thus, when a permanent magnetic piece which is larger than a magnet insertion hole is pressure-inserted therein, the outer peripheral ring portion tends to expand outwardly in the rotor radial direction by the pressure of the fitting protrusions.

Figure 32:
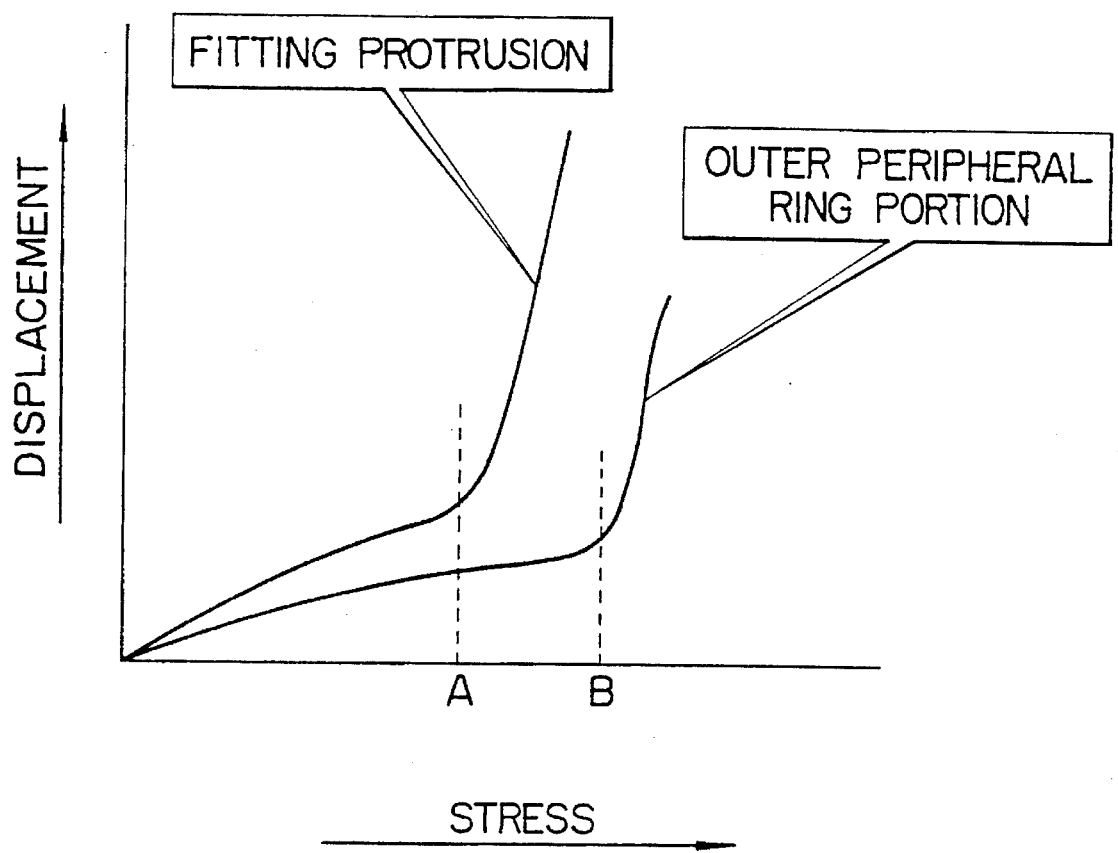
FIG. 32 is a graph showing the relation between displacement and stress of fitting protrusions and an outer peripheral ring portion of a permanent magnetic rotor where the fitting protrusions are plastically deformed before the outer peripheral ring portion is plastically deformed by the permanent magnetic piece.

However, in the permanent magnetic rotor according to the present invention, the displacement of the fitting protrusions against the outer peripheral ring portion corresponding to predetermined pressure is obtained. As shown in FIG. 32, the sizes and shapes of the outer peripheral ring portion and fitting protrusions are determined so that before the stress of the outer peripheral ring portion reaches a yield point B, the stress of the fitting protrusions reaches a yield point A.

In the case that the length and angle of the fitting protrusions against the width of the outer peripheral ring portion have been adjusted, when a permanent magnetic piece which is larger than a standard one is inserted, before stress of the outer peripheral ring portion reaches the yield point B and the outer peripheral ring portion bends, the stress of the fitting protrusions can be reached to the yield point A so that the fitting protrusions are bent. In this case, the fitting protrusions which were plastically deformed have still restoring force. With the restoring force, the permanent magnetic piece can be pressured and fixed. In addition, after the fitting protrusions reach the yield point, the space plastically deformed can absorb the dimensional deviation of the permanent magnetic piece.

It should be noted that a notch may be defined in the middle of each of the fitting protrusions. In addition, the shape of the fitting protrusions may be changed. Moreover, the protrusion angle of the fitting protrusions may be adjusted. In other words, various modifications which will be easily performed by those skilled in the art are included in the scope of the present invention.

Sixth Embodiment

In the permanent magnetic rotor with the rotor iron core made by layering the above-described steel plates, part of each steel plate is recessed by the blanking process. The recessed portion is fitted to another steel plate. Thus, all the steel plates are integrally layered. Hereinafter, this recessed portion is referred to as the caulked portion. The work for integrally binding the steel plates is referred to as the caulking work.

In the conventional permanent magnetic rotor, after permanent magnetic pieces are pressure-inserted, end plates are mounted on both the ends of the rotor iron core. In addition, a balancer is mounted on one end of the rotor iron core so as to balance the weight of the entire permanent magnetic rotor. Thus, the balancer prevents the permanent magnetic rotor from vibrating while it is rotated. Instead of or along with the balancer, holes may be defined on both the ends of the rotor iron core. Hereinafter, these holes are referred to as the balance holes.

However, the balancer causes the construction of the permanent magnetic rotor to become complicated. On the other hand, the balance holes defined on the rotor iron core prevent magnetic flux from flowing along with the caulked portions, thereby lowering the magnetic efficiency of the permanent magnetic rotor.

Next, a permanent magnetic rotor which solves the above problem will be described.

Figure 17:
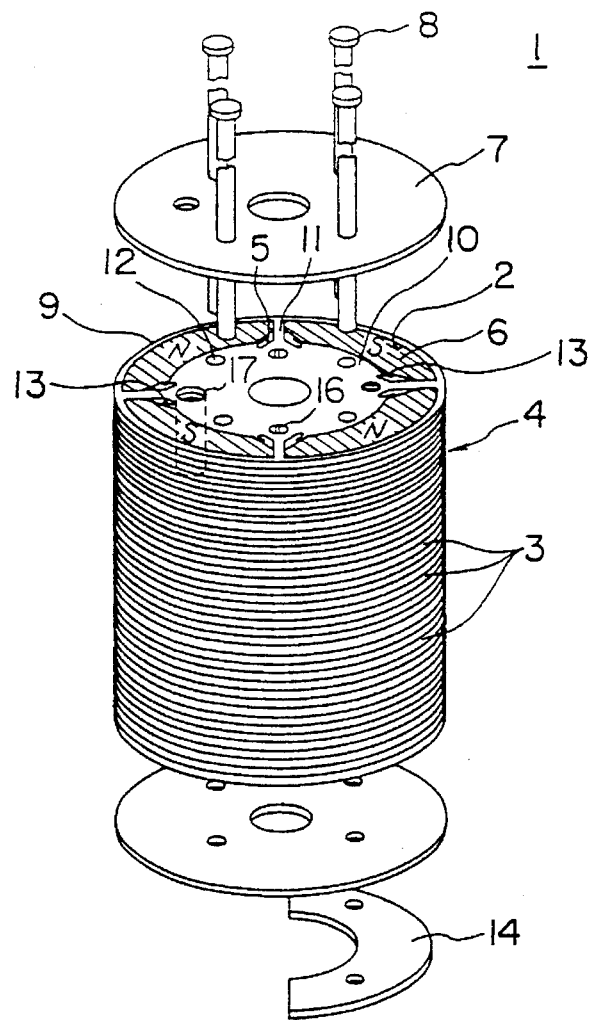
FIG. 17 is an exploded perspective view showing a permanent magnetic rotor with a balance hole corresponding to one of caulked portions.

FIG. 17 is an exploded perspective view showing an permanent magnetic rotor according to the present invention. In the figure, reference numeral 1 is a permanent magnetic rotor. The permanent magnetic rotor 1 comprises a rotor iron core 4, permanent magnetic pieces 6, a pair of end plates 7, a balancer 14, and rivets 8. The rotor iron core 4 is made by layering a large number of circular steel plates 3 each of which has blanked holes 2. The blanked holes 2 of the steel plates 3 being layered define magnet insertion holes 5. The permanent magnetic pieces 6 are inserted into the respective magnet insertion holes 5. The end plates 7 are mounted on both the end surfaces of the rotor iron core 4. The steel plates are connected each other by caulked portions 16. On the yoke portion 10 of the rotor iron core 4, rivet through-holes 12 which passe the rivets 8 and the caulked portions 16 are formed on the periphery thereof at intervals of predetermined angles. At a part of the rotor iron core corresponding to one of the caulked portions 16, a balance hole 17 with a predetermined inner diameter and a predetermined depth is defined.

Figure 18:
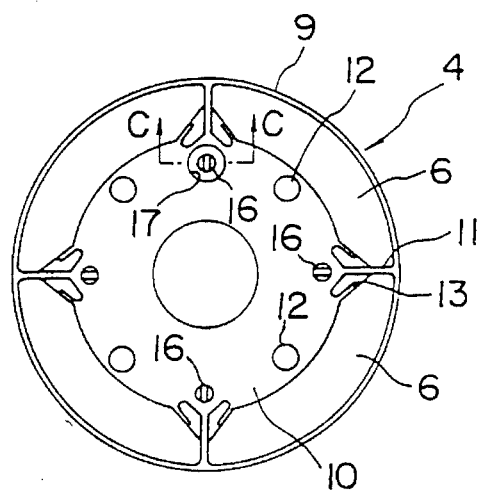
FIG. 18 is a plan view showing an end surface of the permanent magnetic rotor with the balance hole corresponding to one of caulked portions.

FIG. 18 shows an end surface of the rotor iron core 4. In the rotor iron core 4 according to the sixth embodiment, the rivet through-holes 12 and the caulked portions 16 are alternately disposed at intervals of 45° on an inner concentric circle of the end plate 7. At the position of one of the caulked portions 16, the balance hole 17 is defined. The balance hole 17 has the inner diameter which can hold the caulked portion 16.

Figure 19:
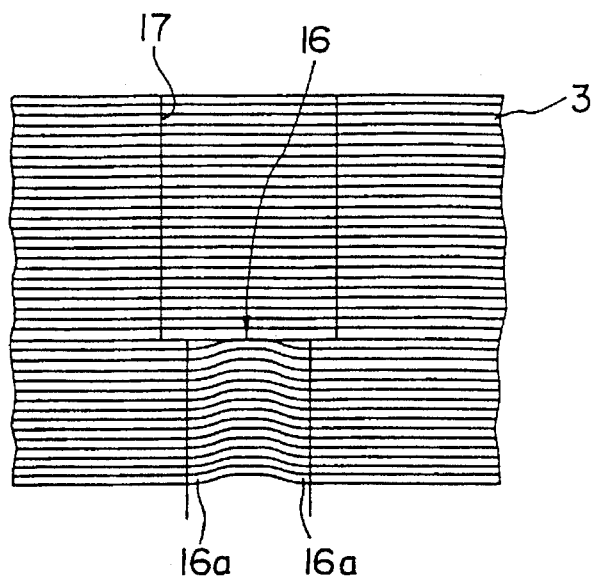
FIG. 19 is an enlarged sectional view showing a caulked portion defining a balance hole.

FIG. 19 is a sectional view showing the balance hole 17 and the caulked portion 16 taken along line C—C of FIG. 18. The caulked portion 16 has a pair of nails 16a each of which is semi-peripherally recessed. Each nail 16a is fitted to the adjacent steel plate 3. With the nails 16a fitted to the steel plates 3, they are mutually connected. The inner diameter of the balance hole 17 is larger than the diameter of the circle of the nails 16a. Thus, the balance hole 17 holds the entire caulked portion 16. The inner diameter and depth of the balance hole 17 are determined corresponding to the unbalancing of the weight of the permanent magnetic rotor.

Next, with reference to FIGS. 20 and 21, the operation of the sixth embodiment of the present invention will be described.

Figure 20:
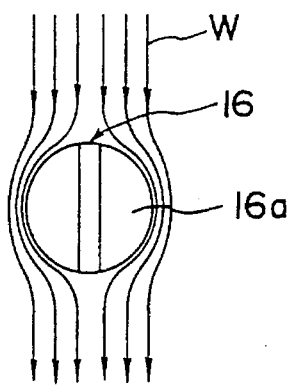
FIG. 20 is a schematic diagram for explaining a flow condition of magnetic flux around a caulked portion.
Figure 21:
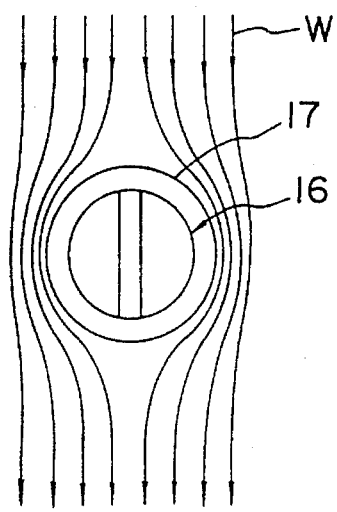
FIG. 21 is a schematic diagram for explaining a flow condition of magnetic flux around the balance hole containing a caulked portion.

As shown in FIG. 20, the caulked portion 16 prevents magnetic flux w from flowing due to a discontinuous portion of steel plates by the nails 16a. In addition, as shown in FIG. 21, the balance hole 17 prevents the magnetic flux w from flowing due to the through-hole of the steel plates. When the balance hole 17 is defined at the same position as the caulked portion 16 so that the balance hole 17 includes the caulked portion 16, the portion which prevents the magnetic flux from flowing can be decreased in comparison with the case where the caulked portion 16 and the balance hole 17 are separately formed. Thus, the magnetic efficiency can be improved.

When the balance hole 17 can solve the unbalancing of the weight of the permanent magnetic rotor 1, the balancer 14 may be omitted.

When the permanent magnetic pieces are inserted into the respective magnet insertion holes so that they are diagonally balanced, the entire permanent magnetic rotor may be easily balanced.

At the portion which defines the balance hole 17, the connecting force by the caulked portion 16 becomes weak. However, the permanent magnetic rotor 1 is finally connected by the rivets 8. Thus, the required connecting force is obtained.

Seventh Embodiment

According to the first embodiment, the hole 2 is defined by blanking portions between the two different concentric circles C1 and C2. The sectional shape of the permanent magnetic piece 6 accords with that of the hole 2.

However, the permanent magnetic piece 6 may slide in the blanked hole 2 in the peripheral direction of the rotor. To pressure-insert the permanent magnetic piece 6 into the corresponding hole 2 so that their centers accurately match, a careful work control is required.

When the center positions on the inner and outer sides of the blanked hole and the permanent magnetic piece are designated so that they differ from each other, the center of the blanked hole can be automatically aligned to the center of the permanent magnetic piece.

Figure 22:
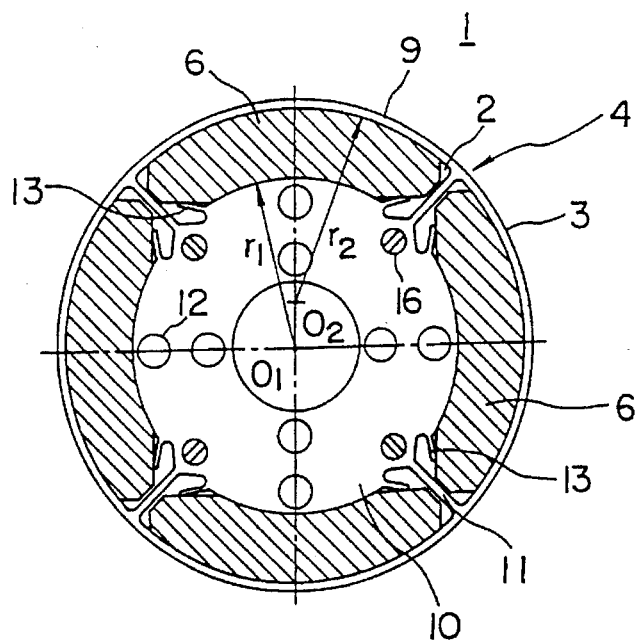
FIG. 22 is a sectional view showing a permanent magnetic rotor where the axial center position on the inner side of a blanked hole differs from that on the outer side thereof.

FIG. 22 is a sectional view showing a permanent magnetic rotor where the axial center position in the rotor radial direction of a blanked hole differs from that of a permanent magnetic piece. As shown in the figure, in the permanent magnetic rotor 1, an axial center point 02 on the outer side of the blanked hole 2 is at an outer position in the radial direction than a center point 01 of the permanent magnetic rotor 1. On the other hand, the axial center of the inner side of the blanked hole 2 accords with the center point 01 of the permanent magnetic rotor 1.

On the other hand, the sectional shape of the permanent magnetic piece 6 accords with that of the blanked hole 2. The center point of the magnetic pole of the permanent magnetic piece 6 is present at a line connecting the center points 01 and 02.

The radii of the outer side and inner side of each of the blanked hole 2 and the permanent magnetic piece 6 are denoted by r1 and r2, respectively. The length of the radius r2 on the outer side is designated corresponding to the length between the axial center 01 and the axial center 02 so that the width h1 at the center of the outer peripheral ring portion becomes constant and the volume of the permanent magnetic piece does not become excessively small.

Figure 23:
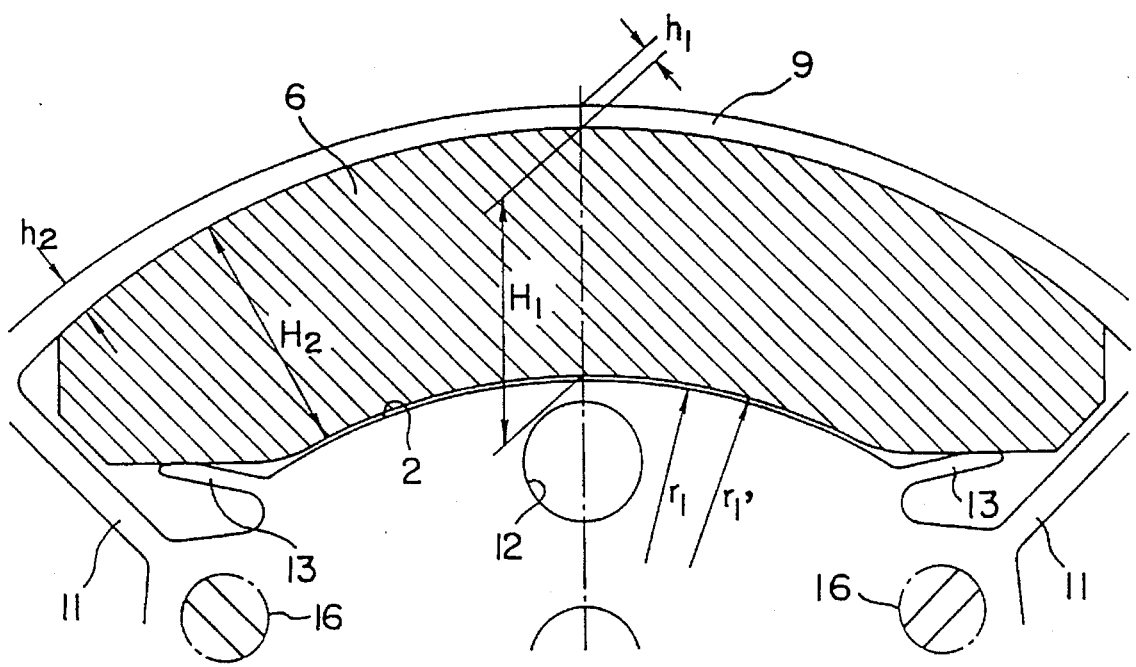
FIG. 23 is a partial enlarged sectional view showing a permanent magnetic rotor where the axial center position on the inner side of a blanked hole differs from that on the outer side thereof.

FIG. 23 is an enlarged sectional view showing a blanked hole 2. As shown in FIG. 22, when the axial center 01 on the outer side of the blanked hole 2 is placed outside the axial center 02, the width h1 at the center of the outer peripheral ring portion 9 becomes narrower than the width h2 at the end portion thereof (h1<h2).

On the other hand, the width H1 at the center of the permanent magnetic piece 6 is larger than the width H2 at the end thereof (H1>H2). Thus, the center positions of the blanked hole 2 and the permanent magnetic piece 6 are designated by their shapes. By pressure-inserting the permanent magnetic piece 6 into the blanked hole 2, the center of the outer peripheral ring portion 9 can be correctly aligned to the center of the permanent magnetic piece 6.

Permanent Magnetic Rotor Producing Apparatus

The permanent magnetic rotor 1 according to each of the above-described embodiments has magnet insertion holes 5. In each magnet insertion hole 5, fitting protrusions 13 are formed. With the fitting protrusions 13, each permanent magnetic piece 6 is pressured and fixed. Thus, when the permanent magnetic piece 6 is pressure-inserted, the permanent magnetic piece 6 is always pressured outwardly in the rotor radial direction. On the other hand, to improve the magnetic efficiency, the outer peripheral ring portion 9 is formed so that its width becomes as narrow as possible. Thus, the outer peripheral ring portion 9 may be deformed in the direction that the permanent magnetic piece 6 is pressure-inserted due to frictional force of the permanent magnetic piece 6 and the outer peripheral ring portion 9.

Next, a permanent magnetic rotor producing apparatus which can pressure-insert permanent magnetic pieces 6 in respective magnet insertion holes without deformation of the outer peripheral ring portion 9 will be described.

Eighth Embodiment

Figure 24:
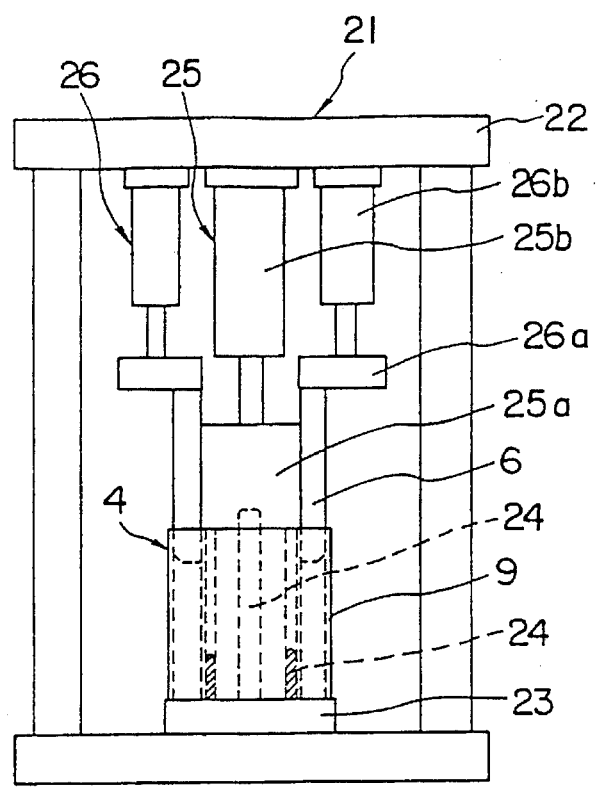
FIG. 24 is a sectional view showing the construction of a permanent magnetic rotor producing apparatus having a first pressure apply device and a second pressure apply device.

FIG. 24 shows the construction of a permanent magnetic rotor producing apparatus having a first pressure apply device and a plurality of second pressure apply devices. The first pressure apply device pressures a rotor iron core before permanent magnetic pieces are pressure-inserted. The second pressure apply devices pressure-insert the permanent magnetic pieces.

As shown in the figure, the permanent magnetic rotor producing apparatus 21 has a frame 22. On a base table of the frame 22, a table 23 which holds a rotor iron core 4 is disposed. On the upper surface of the table 23, an alignment pin 24 for aligning the rotor iron core 4 is vertically disposed.

On an upper beam of the frame 22, a first pressure apply device 25 and a plurality of second pressure apply devices 26 are disposed. The first pressure apply device 25 comprises a first pressure apply head 25a and a hydraulic device 25b. Each second pressure apply device 26 comprises a second pressure apply head 26a and a hydraulic pressure device 26b. The first pressure apply head 25a has a shape for pressuring a yoke portion of a rotor iron core. The first pressure apply head 25a is driven by the hydraulic device 25b. Each second pressure head 26a pressures only a permanent magnetic piece 6. The second pressure head 26a is driven by the hydraulic device 26b. The first pressure apply device 25 and the second pressure apply devices 26 are independently driven. The hydraulic devices 26b of the second pressure apply devices 26 are preferably synchronized.

When a permanent magnetic rotor is produced by the permanent magnetic rotor producing apparatus 21, a rotor iron core 4 is aligned on the table 23. The rotor iron core 4 is pressured in the axial direction thereof by the first pressure apply device 25. While the first pressure apply device 25 is being pressured, each second pressure apply device 26 pressure-inserts a permanent magnetic piece 6.

When the permanent magnetic piece 6 is being pressure-inserted by the above-described pressure-insertion method, the rotor iron core 4 is pressured onto the table. The pressure-insertion force of the permanent magnetic piece 6 prevents the outer peripheral ring portion 9 from being deformed.

Since the rotor iron core 4 is pressured in the axial direction thereof by the first pressure apply device 25, the caulked portions of the steel plates are pressured. Thus, the connecting force of the steel plates becomes strong. This work is referred to as the primary caulking work. This work is performed after the steel plates are layered. Thus, according to the permanent magnetic rotor producing apparatus of the present invention, the primary caulking work can be omitted. As a result, the permanent magnetic rotor can be more easily produced.

Ninth Embodiment

When a guide which guides a permanent magnetic piece 6 is disposed at the forward end of the first pressure apply head 25a of the above-described permanent magnetic rotor producing device 21, the permanent magnetic piece 6 can be more easily pressure-inserted.

Figure 25:
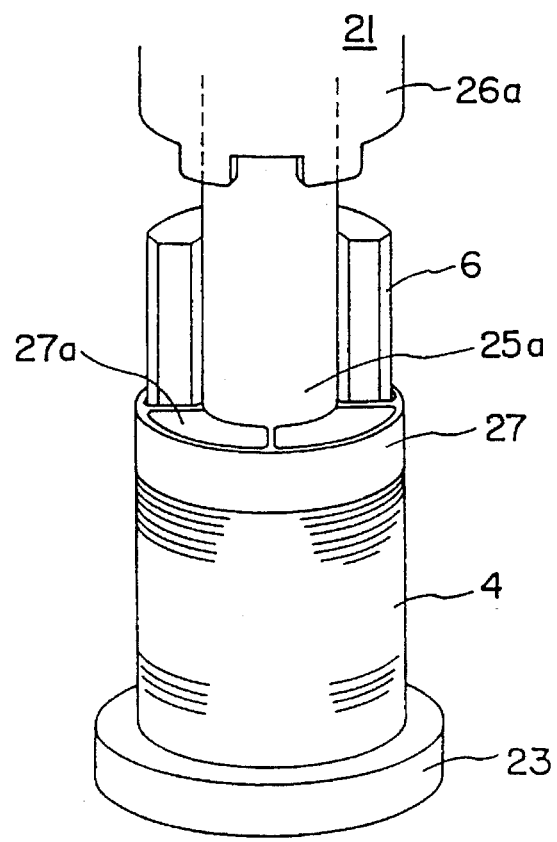
FIG. 25 is a partial perspective view showing a permanent magnetic rotor producing device with a guide disposed at the first pressure apply device.

FIG. 25 shows a part of a permanent magnetic rotor producing apparatus with a guide disposed at the forward end of the first pressure apply head. In the figure, at the forward end of the first pressure apply head 25a, a guide 27 which guides a permanent magnetic piece 6 is disposed. The lower surface of the guide 27 pressures the entire end surface of the rotor iron core 4. The guide 27 has guide holes 27a which accord with the shape and positions of the magnet insertion holes 5 of the rotor iron core 4.

According to the permanent magnetic rotor producing apparatus of the ninth embodiment, before a permanent magnetic piece 6 is pressure-inserted, the guide 27 pressures the rotor iron core 4 in the axial direction thereof. Next, the lower end of the permanent magnetic piece 6 is inserted into the guide hole 27a so as to align the pressure-insert direction. Then, while the rotor iron core 4 is being pressured by the first pressure apply device 25, the permanent magnetic pieces 6 are pressure-inserted by the second pressure apply devices 26. Since the pressure-insert direction of the permanent magnetic pieces 6 has been aligned and they are guided by the guide holes 27a, the permanent magnetic pieces 6 can be securely and easily pressure-inserted.

Tenth Embodiment

When the permanent magnetic piece 6 is pressure-inserted by the above-described permanent magnetic rotor producing device, the rotor iron core 4 may extrude in the rotor radial direction. In this case, the motor rotation may be adversely affected.

Figure 26:
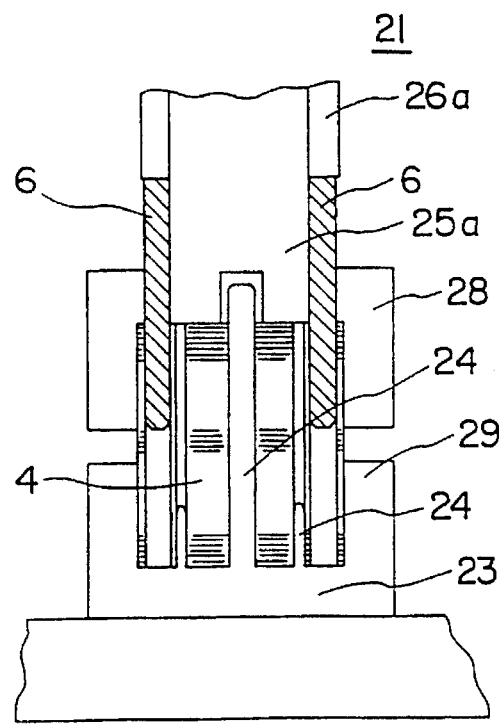
FIG. 26 is a partial perspective view showing the construction of a permanent magnetic rotor producing apparatus with an iron core outer periphery holding ring.

FIG. 26 shows a part of a permanent magnetic rotor producing apparatus with an iron core outer periphery holding ring which prevents a rotor iron core from extruding in the radial direction thereof.

In the figure, reference numeral 21 is a permanent magnetic rotor producing apparatus. The permanent magnetic rotor producing apparatus 21 has a pair of iron core outer periphery holding rings 28 and 29 which are engaged with the ends and the outer periphery of a rotor iron core 4. The iron core outer periphery holding ring 29 may be integrally formed along with the table 23.

When a permanent magnetic piece 6 is pressure-inserted, the ends of a rotor iron core 4 are engaged with the iron core outer periphery holding rings 28 and 29. The rotor iron core 4 is pressured by the first pressure apply device 25. In this condition, the permanent magnetic pieces 6 are pressure-inserted by the second pressure apply devices 26.

Thus, when the permanent magnetic pieces 6 are pressure-inserted, the iron core outer periphery holding rings 28 and 29 prevent the outer peripheral surface of the rotor iron core 4 from extruding.

The iron core outer periphery holding rings may hold at least the outer peripheral surface of the ends of the rotor iron core 4 and cover the entire outer peripheral surface thereof.

Eleventh Embodiment

Next, a permanent magnetic rotor producing apparatus which pre-deforms the outer peripheral ring portion of a rotor iron core in a predetermined size will be described. By this apparatus, a permanent magnetic rotor with high magnetic efficiency can be produced.

Figure 27:
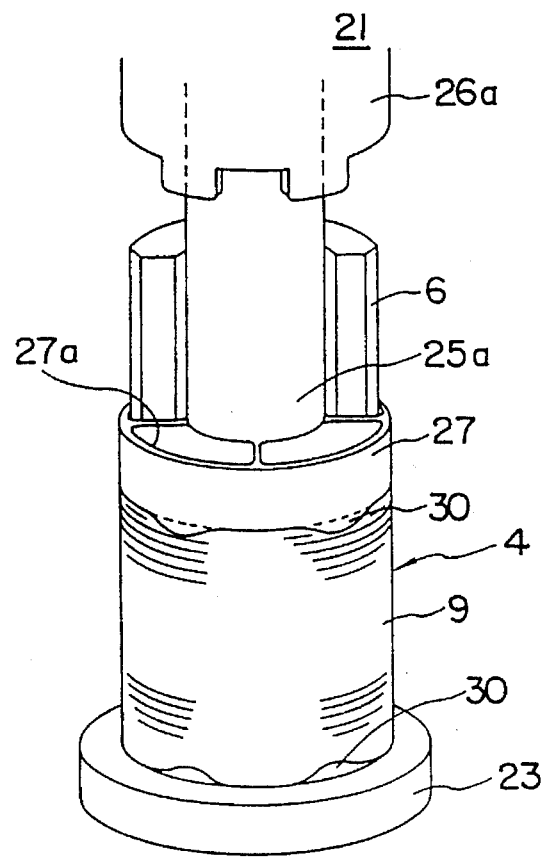
FIG. 27 is a partial perspective view showing the construction of a permanent magnetic rotor producing apparatus with protrusions which pressure a part of the outer peripheral ring portion of a rotor iron core, the protrusions being disposed on the lower side of the guide and on the upper surface of the table.

FIG. 27 shows a part of a permanent magnetic rotor producing apparatus which deforms an outer peripheral ring portion by a predetermined length.

In the figure, reference numeral 21 is a permanent magnetic rotor producing apparatus. The permanent magnetic rotor producing apparatus 21 has a guide 27. The guide 27 is disposed at the lower end of the first pressure apply head 25a. At portions where the guide 27 is in contact with the outer peripheral ring portion 9, a plurality of protrusions 30 are formed. Each protrusion 30 lowers a part of the outer peripheral ring portion 9 which accords with the center of the permanent magnetic piece 6 by a predetermined length.

In the eleventh embodiment, the table 23 also has protrusions 30 which are similar to those disposed on the guide 27.

According to the eleventh embodiment, when the rotor iron core 4 is pressured by the first pressure apply device 25, particular areas of the outer peripheral ring portion 9 of the rotor iron core 4 are lowered by the protrusions 30. The length of the outer peripheral ring portion 9 being lowered always becomes constant by the entire pressure of the rotor iron core 4 and the height of the protrusions 30.

Figure 28:
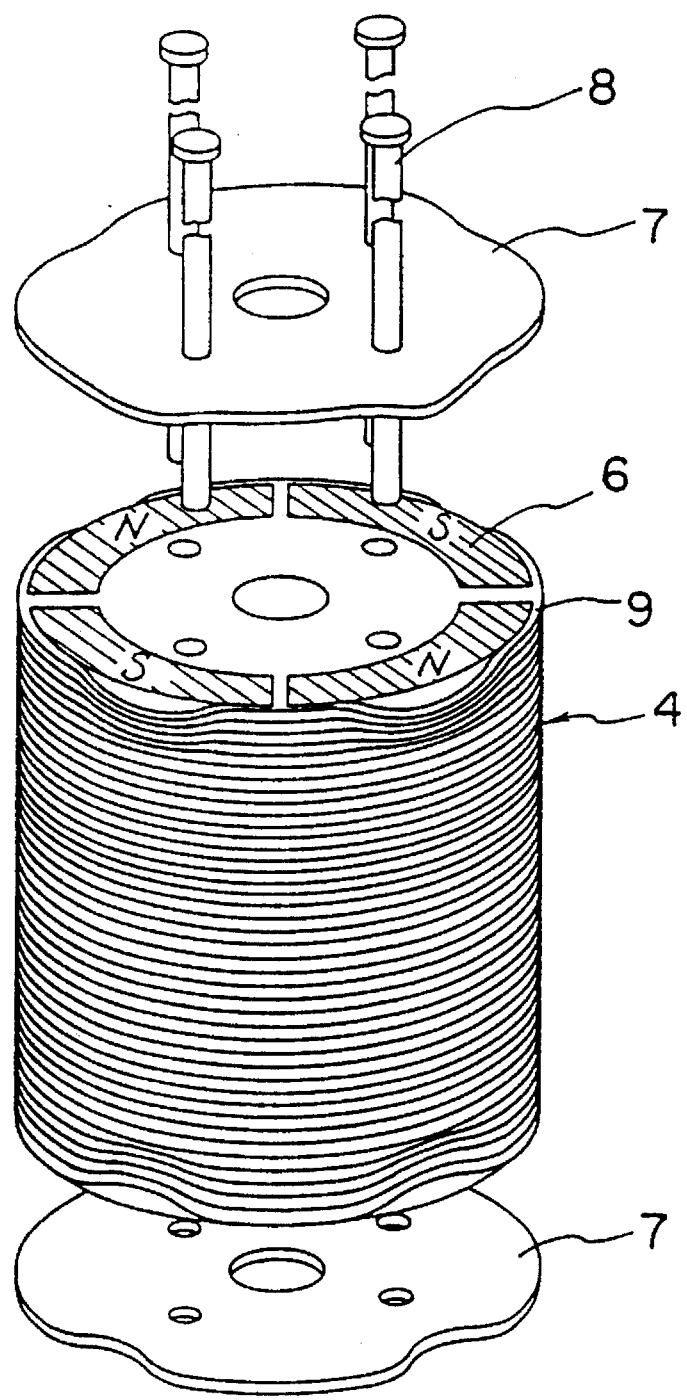
FIG. 28 is an exploded perspective view showing a permanent magnetic rotor produced by the permanent magnetic rotor producing apparatus of FIG. 27.
Figure 29:
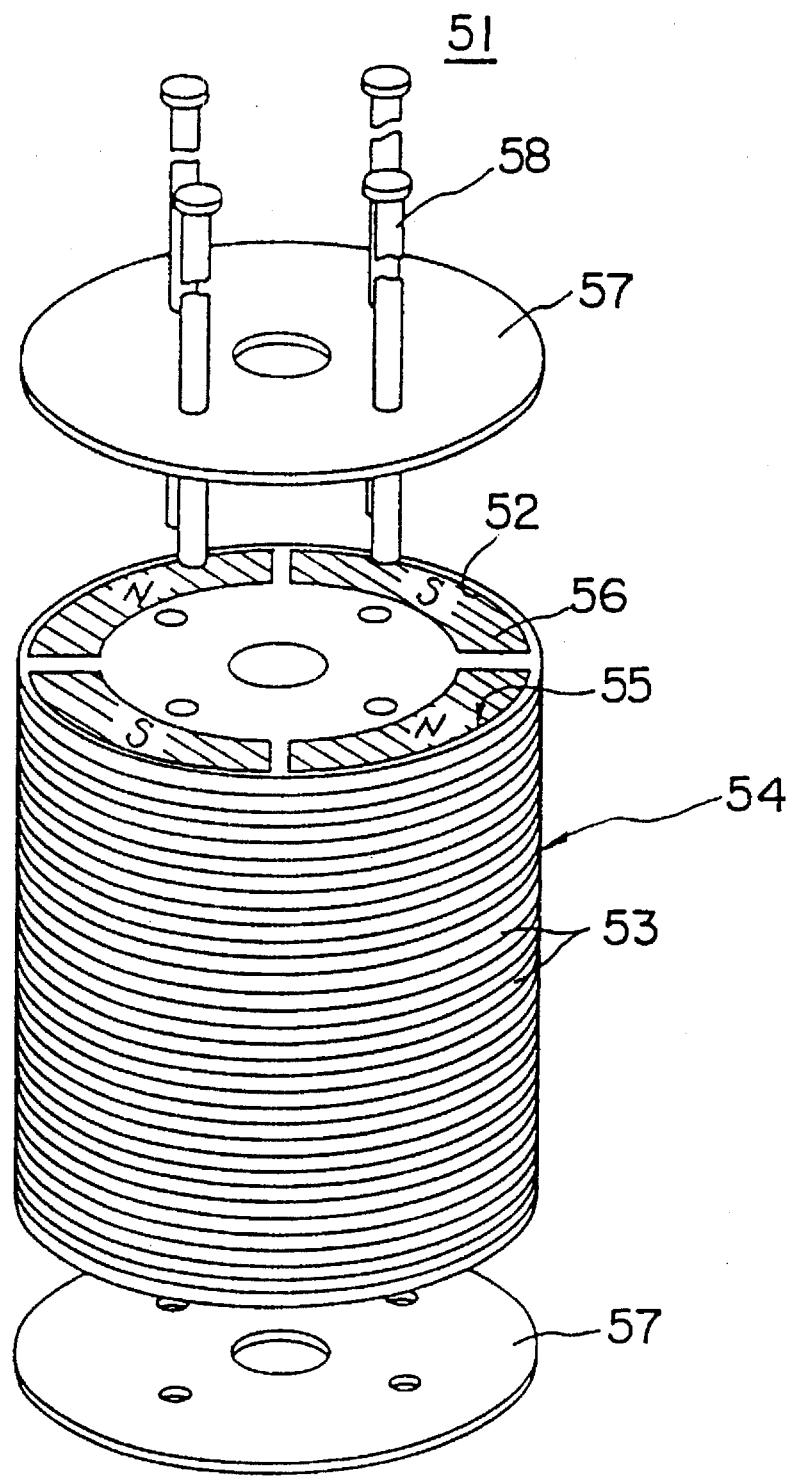
FIG. 29 is an exploded perspective view showing a conventional permanent magnetic rotor.
Figure 30:
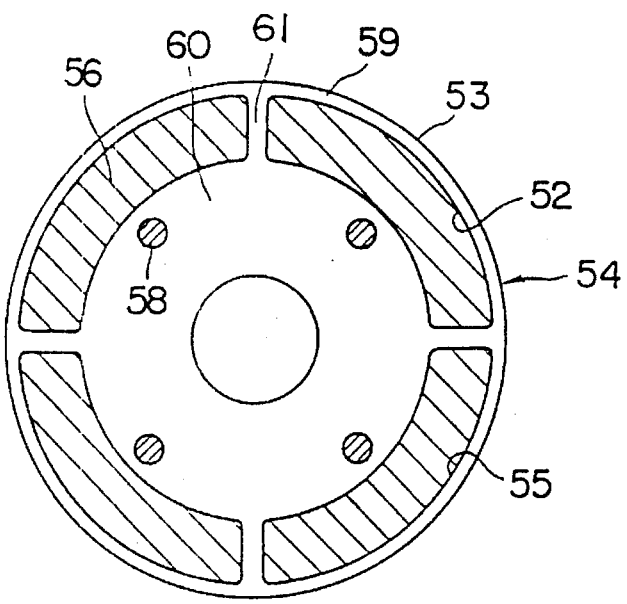
FIG. 30 is a cross sectional view showing a conventional permanent magnetic rotor.
Figure 31:
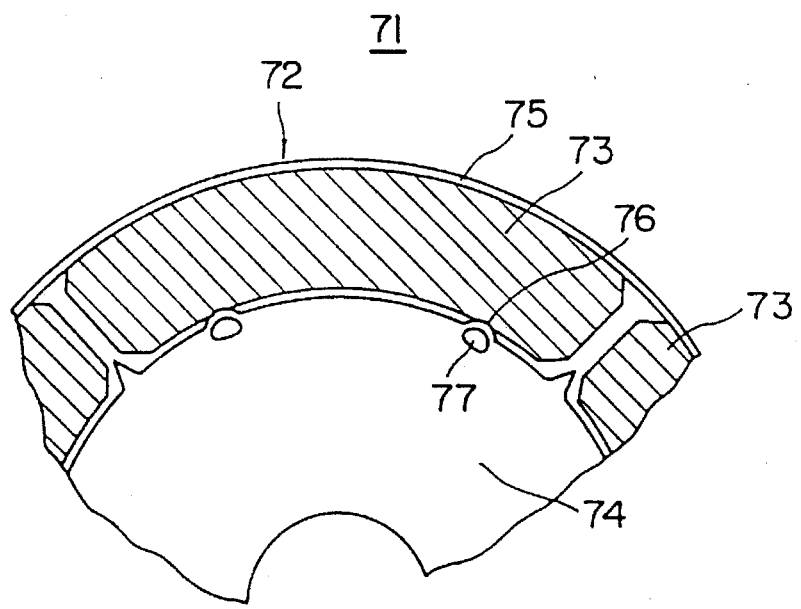
FIG. 31 is an enlarged sectional view showing another conventional permanent magnetic rotor.

After the permanent magnetic pieces 6 are pressure-inserted, the rotor iron core 4 is deformed as shown in FIG. 28. An end plate 7 which is in contact with the outer peripheral ring portion 9 is mounted on the rotor iron core 4.

Thus, the permanent magnetic rotor 1 where the end plate 7 is in contact with the outer peripheral ring portion 9 can be obtained. This permanent magnetic rotor 1 does not leak magnetic flux from a gap between the end plate 7 and the end surface of the rotor iron core 4. Thus, the magnetic efficiency is high. The protrusions 30 may be formed either on the guide 27 or the table 23.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A permanent magnetic rotor, comprising:

a rotor iron core constructed of a large number of steel plates being layered, each of said steel plates peripherally defining a plurality of sector-shaped blanked holes; and sector-shaped permanent magnetic pieces inserted into said blanked holes;

wherein each of said steel plates comprises:

an outer peripheral ring portion formed on an outer side of each of said blanked holes;

a yoke portion formed on an inner side of each of said blanked holes;

a connect portion formed between said outer peripheral ring portion and said yoke portion; and thin and long fitting protrusions formed at corner portions of each of said blanked holes, said fitting protrusions projecting inward from the connect portion at the corner portions towards a magnet insertion hole formed by each of said blanked holes, said fitting protrusions being fitted to each of said permanent magnetic pieces so as to pressure and fix each of said permanent magnetic pieces.

2. The permanent magnetic rotor as set forth in claim 1, wherein each of said permanent magnetic pieces has chamfer surfaces at inner corners thereof, and wherein each of said fitting protrusions is fitted to each of said permanent magnetic pieces at said chamfer surfaces.

3. The permanent magnetic rotor as set forth in claim 1 or 2, wherein said fitting protrusions are disposed in a direction that said steel plates are layered in predetermined intervals.

4. The permanent magnetic rotor as set forth in claim 1, wherein each of said corner portions of each of said blanked holes is formed by blanking two areas which overlap each other, the overlap portion being adapted to form a protrusion, said protrusion being disposed in a space defined by an end portion in a rotor peripheral direction of each of said permanent magnetic pieces and an inner side of said magnet insertion hole.

5. The permanent magnetic rotor as set forth in claim 1, wherein size and shape of each of said blanked holes and said fitting protrusions are designated so that each of said fitting protrusions is plastically deformed before said outer peripheral ring portion is plastically deformed by each of said permanent magnetic pieces when each of said permanent magnetic pieces is pressure-inserted into said magnet insertion hole.

6. The permanent magnetic rotor as set forth in claim 1, wherein said steel plates are integrally layered by caulked portions, a balance hole with a predetermined length being defined corresponding to a position of one of said caulked portions of said rotor iron core.

7. The permanent magnetic rotor as set forth in claim 1, wherein an axial center point on an outer side in a rotor radius direction of each of said blanked holes is disposed at an outer position than an axial center point on an inner side thereof, a sectional shape of each of said permanent magnetic pieces nearly corresponds to that of each of said blanked holes.

8. A permanent magnetic rotor, comprising:

a rotor iron core constructed of a large number of steel plates being layered, each of said steel plates peripherally defining a plurality of sector-shaped blanked holes; and sector-shaped permanent magnetic pieces inserted into said blanked holes;

wherein each of said steel plates comprises:

an outer peripheral ring portion formed on an outer side of each of said blanked holes;

a yoke portion formed on an inner side of each of said blanked holes;

a connect portion formed between said outer peripheral ring portion and said yoke portion; and thin and long fitting protrusions formed at the yoke portion of each of said blanked holes in vicinity of corner portions of each of said blanked holes, said fitting protrusions projecting inward from the yoke portion towards a magnet insertion hole formed by each of said blanked holes, said fitting protrusions being fitted to each of said permanent magnetic pieces so as to pressure and fix each of said permanent magnetic pieces.

9. The permanent magnetic rotor as set forth in claim 8, wherein:

each of said permanent magnetic pieces has chamfer surfaces at inner corners thereof, and each of said fitting protrusions is fitted to each of said permanent magnetic pieces at said chamfer surfaces.

10. The permanent magnetic rotor as set forth in claim 8 or 9, wherein said fitting protrusions are disposed in a direction that said steel plates are layered in predetermined intervals.

11. The permanent magnetic rotor as set forth in claim 8, wherein each of said corner portions of each of said blanked holes is formed by blanking two areas which overlap each other, the overlap portion being adapted to form a protrusion, said protrusion being disposed in a space defined by an end portion in a rotor peripheral direction of each of said permanent magnetic pieces and an inner side of said magnet insertion hole.

12. The permanent magnetic rotor as set forth in claim 8, wherein a size and shape of each of said blanked holes and said fitting protrusions are designated so that each of said fitting protrusions is plastically deformed before said outer peripheral ring portion is plastically deformed by each of said permanent magnetic pieces when each of said permanent magnetic pieces is pressure-inserted into said magnet insertion hole.

13. The permanent magnetic rotor as set forth in claim 8, wherein said steel plates are integrally layered by caulked portions, a balance hole with a predetermined length being defined corresponding to a position of one of said caulked portions of said rotor iron core.

14. The permanent magnetic rotor as set forth in claim 8, wherein an axial center point on an outer side in a rotor radius direction of each of said blanked holes is disposed at an outer position than an axial center point on an inner side thereof, a sectional shape of each of said permanent magnetic pieces nearly corresponds to that of each of said blanked holes.

* * * * *